United States Patent [19]

Timmons

[11] 3,750,259
[45] Aug. 7, 1973

[54] METHOD AND APPARATUS FOR REPAIRING THREADS OF A THROUGH BORE BY INSTALLING A THREADED SLEEVE

[76] Inventor: Thomas L. Timmons, 380 E. Benwood St., Covina, Calif. 91722

[22] Filed: Dec. 14, 1970

[21] Appl. No.: 97,845

[52] U.S. Cl. .................. 29/401, 29/240, 85/23, 151/41.72
[51] Int. Cl. ............................................. B23p 7/00
[58] Field of Search ................. 29/240, 401; 85/23; 151/41.72

[56] References Cited
UNITED STATES PATENTS

| | | | |
|---|---|---|---|
| 3,619,892 | 11/1971 | Roeschlaub | 29/401 X |
| 2,855,970 | 10/1958 | Neuschotz | 151/23 |
| 3,279,053 | 10/1966 | Neuschotz | 29/523 |
| 2,407,904 | 9/1946 | Rosan | 29/401 |
| 3,254,690 | 6/1966 | Neuschotz | 151/22 |
| 2,561,433 | 7/1951 | Uhle | 151/41.72 X |
| 3,280,874 | 10/1966 | Rosan | 151/41.72 |
| 3,568,230 | 3/1971 | Rosan | 151/41.72 X |

FOREIGN PATENTS OR APPLICATIONS 220,892  4/1962  Austria ............. 151/41.72

Primary Examiner—Charles W. Lanham
Assistant Examiner—D. C. Reiley, III
Attorney—Clarence A. O'Brien and Harvey B. Jacobson

[57] ABSTRACT

An assemblage of components for use in renewing damaged threads of a bore and including (1) a reamer tool including a first inserted smooth cylindrical pilot end portion for reaming a bore with damaged threads to a smooth cylindrical over-size bore and including a tail portion for forming a counterbore at the outer end of the over-size bore, (2) a right hand threaded tap for forming right-hand threads in the over-size bore and including a smooth cylindrical head end pilot portion snugly receivable within the over-size bore, (3) a right-hand threaded shank including a diametrically enlarged head and a jam-type nut threadedly engaged therewith with left-hand threads and threadedly engageable in an inside and outside right hand threaded sleeve-type insert for installation within the threaded over-size bore, (4) an inside and outside right hand threaded sleeve insert and (5) a threaded nut-type flaring tool including a through compression bolt threadedly engageable in a blind bore formed in the first inserted end of the sleeve insert installation shank for flaring the first inserted end of the sleeve insert in the corresponding end of the threaded over-size bore. The reamer is of course initially utilized to enlarge a threaded bore having damaged threads after which the tap is utilized to form righthand threads in the enlarged bore. The sleeve insert installation tool is thereafter utilized to turn the externally threaded sleeve insert into tight seated engagement within the threaded enlarged bore and the flaring tool with its companion compression bolt is thereafter utilized to flare the inner end of the sleeve insert within the threaded enlarged bore so as to prevent loosening of the insert within the threaded enlarged bore and removal of the insert from the threaded enlarged bore.

4 Claims, 11 Drawing Figures

PATENTED AUG 7 1973
3,750,259
SHEET 1 OF 3
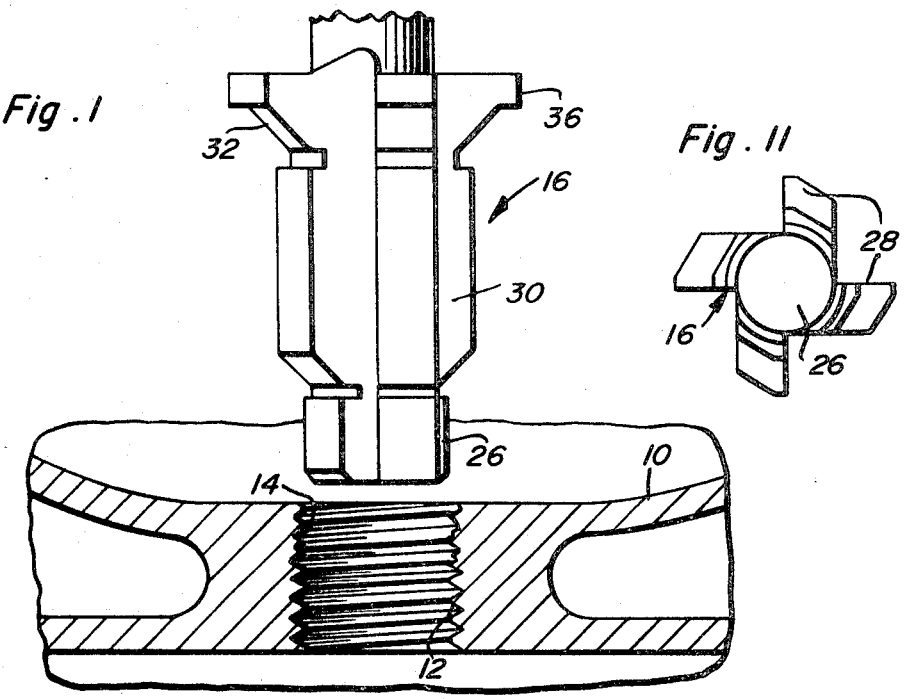
Fig. 1
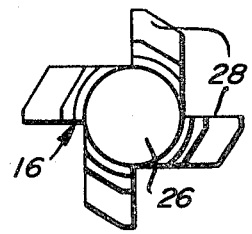
Fig. 11
Fig. 2
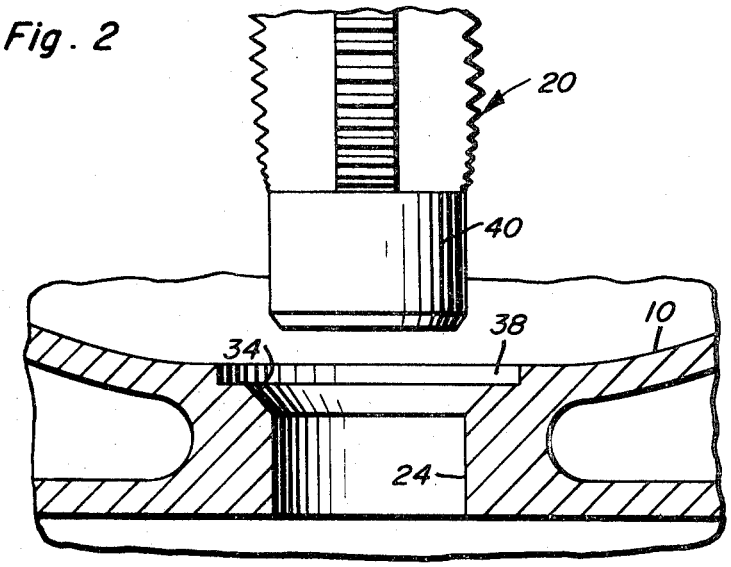
Fig. 3
Thomas L. Timmons
INVENTOR.
BY *Clarence A. O'Brien*
*and Harvey B. Jacobson*
Attorneys Fig. 4
Fig. 5
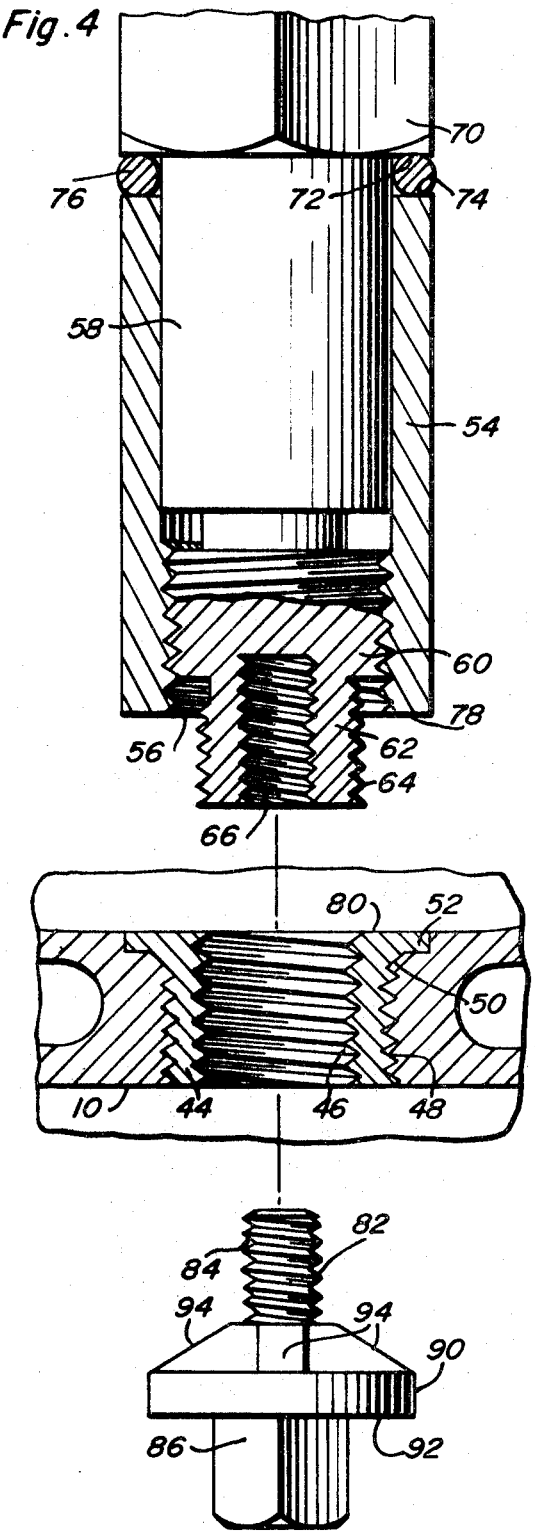
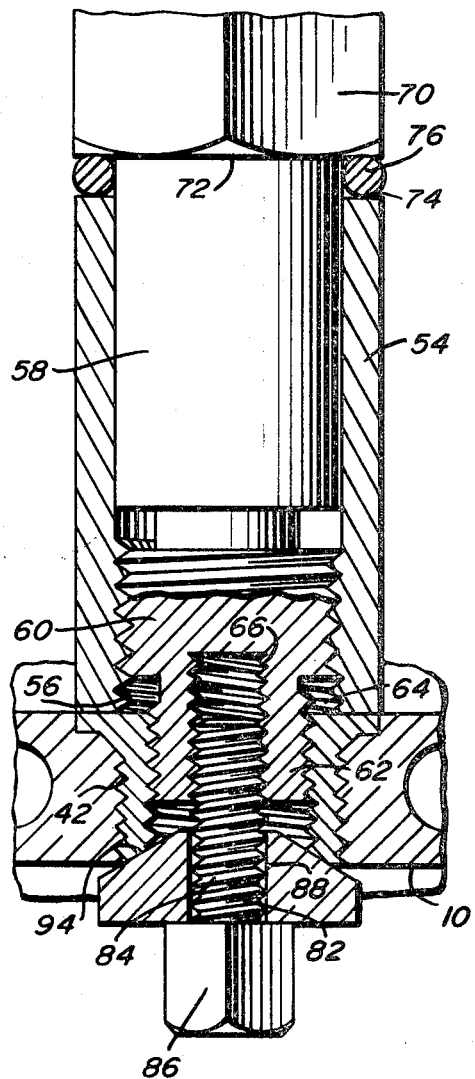
Thomas L. Timmons
INVENTOR.
BY Clarence A. O'Brien
and Harvey B. Jacobson
Attorneys

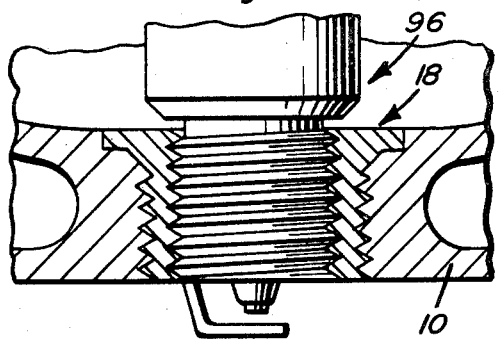
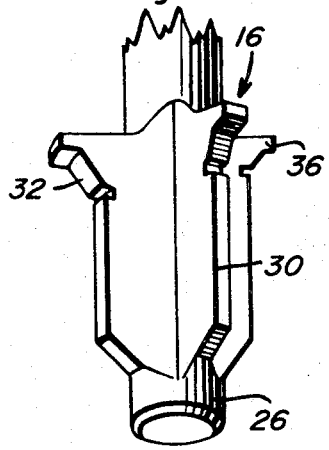
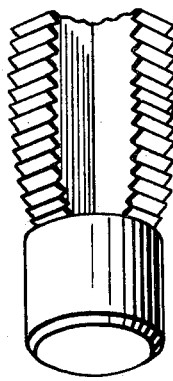
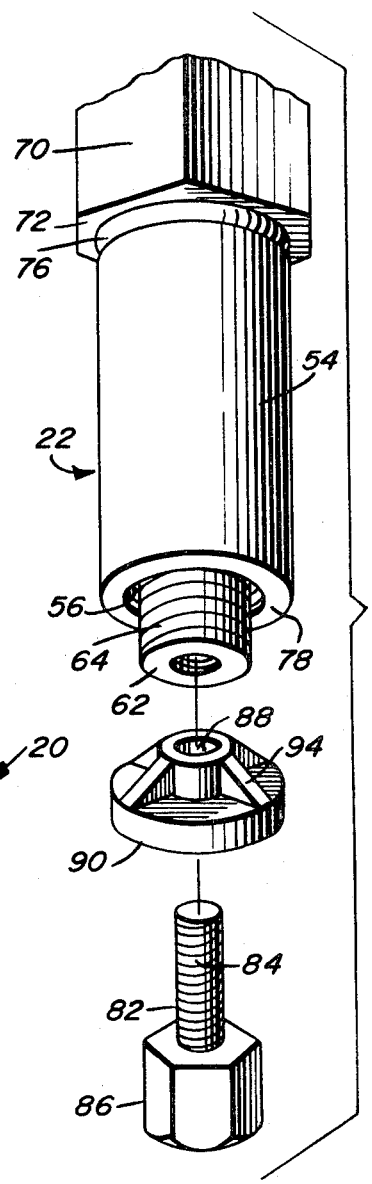
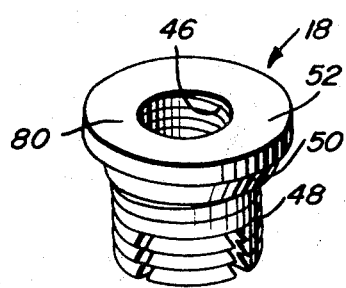
Thomas L. Timmons
INVENTOR.

METHOD AND APPARATUS FOR REPAIRING THREADS OF A THROUGH BORE BY INSTALLING A THREADED SLEEVE

The method and apparatus of the instant disclosure provide a means whereby the threads within a given bore may, in effect, be renewed and possibly rendered more efficient than the damaged original threads. Although the instant disclosure has been specifically designed for repairing damaged spark plug bores in combustion engine cylinder heads, the method and apparatus may be effectively practiced in other environments.

Although engine and spark plug manufacturers are quite specific in the recommended tightening of spark plugs of associated internal combustion engines and the like, the recommended tightening of spark plugs is quite easily exceeded by hand with the result that spark plugs are often over-tightened resulting in the threaded bores in which they are secured having the threads thereof damaged, this being especially true when the spark plugs are utilizied in conjunction with cylinder heads constructed of aluminum.

While the utilization of over-size threaded sleeves has heretofore been practiced in renewing spark plug bores after the damaged threaded bores have been drilled and tapped over-size, conventional over-size drilling and the insertion of a threaded sleeve in the over-size bore has not proven completely effective inasmuch as there is necessarily some clearance between the threaded insert sleeve and the over-size threaded bore in which the sleeve is secured and compression leakage occurs between the sleeve insert and the threaded over-size bore. In addition, the insert sleeves utilized heretofore in renewing spark plug bores have been constructed of materials different than the materials utilized in the construction of the heads in which the sleeves are mounted and the sleeve inserts therefore have a different coefficient of expansion which results in the insert sleeves or sleeve inserts being quite loose at least during a given engine operating temperature. The looseness of these previously used sleeve inserts results not only in loss of compression but also in the sleeves themselves backing out or becoming inadvertently loosened when the spark plugs are next removed.

It is accordingly the main object of this disclosre to provide a method and apparatus of installing over-size sleeve inserts within spark plug bores capable of installing the sleeve inserts in such a manner that they are sufficiently tightened in the over-size threaded bores to prevent leakage thereabout.

Another object of this disclosure, in accordance with the immediately preceding object, is to provide a method and apparatus of installing over-size sleeve inserts incorporating a procedure of flaring circumferentially spaced portions of the inserted sleeve insert into the surrounding threaded body in which the inserts are secured so as to prevent accidental loosening of the sleeve inserts.

Still another object of this disclosure is to provide a method and apparatus for installing threaded sleeves which invloves the basic steps presently utilized for installing conventional threaded sleeves and which therefore requires no special training.

A final object of this disclosure to be specifically enumerated herein is to provide a method and apparatus in accordance with the preceding objects which will conform to conventional forms of manufacture, be of simple construction and easy to use and follow so as to provide a device which will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary vertical sectional view of a cylinder head having a bore formed therethrough with damaged threads and with the reamer portion of the instant invention positioned for reaming the bore to over-size;

FIG. 2 is a vertical sectional view similar to FIG. 1 but with the over-size bore formed in the cylinder head and provided with a counterbore at its outer end and with the pilot tipped shank of the tap portion of the instant invention in position to tap the over-size bore;

FIG. 3 is a sectional view similar to FIGS. 1 and 2 illustrating the threaded over-size bore;

FIG. 4 is a fragmentary vertical sectional view of the over-bored portion of the cylinder head having the sleeve insert portion of the instant disclosure tightly seated therein and with the sleeve installing tool and its insert flaring companion part illustrated in exploded position;

FIG. 5 is a view similar to FIG. 4 but illustrating the sleeve insert installing and flaring tool in the process of being utilized to flare circumferentially spaced portions of the inner end of the inserted sleeve;

FIG. 6 is a fragmentary vertical sectional view similar to FIG. 3 but illustrating the sleeve insert and an associated spark plug secured in the repaired spark plug bore;

FIG. 7 is a fragmentary perspective view of the reamer portion of the instant disclosure;

FIG. 8 is a perspective view of the sleeve insert portion of the instant disclosure;

FIG. 9 is a fragmentary perspective view of the tap portion of the instant disclosure;

FIG. 10 is an exploded perspective view of the sleeve installing and flaring tool portion of the instant disclosure; and FIG. 11 is an end elevational view of the reamer portion of the instant disclosure.

Referring now more specifically to the drawings the numeral 10 generally designates a cylinder head having a spark plug bore 12 formed therein with damged threads 14.

FIG. 7 illustrates the reamer portion of the instant disclosure generally designated by the reference numeral 16, FIG. 8 illustrates the sleeve insert portion of the instant disclosure referred to in general by the reference numeral 18, FIG. 9 illustrates the tap portion of the instant disclosure referred to in general by the reference numeral 20 and FIG. 10 illustrates the sleeve installing and flaring tool of the instant disclosure referred to in general by the reference numeral 22.

In repairing the bore 12 the reamer portion 16 is utilized to ream the bore 12 to over-size by removing all of the material of the head 10 defining the threads 14 and a small amount of extra material from the head 10 in order to form a smooth bore such as that illustrated in FIG. 2 and designated by the reference numeral 24. The reamer portion 16 includes a smooth cylindrical head end portion 26 defining a pilot shank portion which is generally of the same diameter as the minimum diameter of the threaded bore 12. The head end portion 26 is thus receivable in the bore 12 to ensure proper alignment of the reamer portion 16 with the original threaded bore 12. The reamer portion 16 includes generally radially outwardly projecting and longitudinally extending reamer teeth 28 spaced circumferentially thereabout and the reamer teeth 28 include first inserted portions 30 for forming the diametrically enlarged smooth bore 24, second inserted portions 32 for beveling the outer end of the bore 24 as at 34 and third portions 36 for forming a counterbore 38 at the outer end of the beveled portion 34 of the bore 24. Thus, with the reamer portion 16 supported from a motor driven or hand driven rotary member, the reamer portion 16 has its head end portion 26 inserted into the bore 12 and is then caused to rotate while the first, second and third portions 30, 32 and 36 are axially advanced into the bore 12 with the result that the large smooth bore 24 is formed including the beveled portion 34 and the outer end counterbore 38. Then, the diametrically enlarged bore 24 is threaded by utilization of the tap 20 which is also supported from a motor driven rotary member or a hand driven rotary member and it may be seen that the tap 20 includes a first inserted pilot shank portion 40 similar to the pilot shank portion 26 and snugly receivable and rotatable in the bore 24 so as to ensure that the tap or tap portion 20 will be correctly axially aligned with the bore 24. Of course, movement of the tap portion 20 into the bore 24 will cause the latter to be threaded as at 42, see FIG. 3.

The sleeve insert portion 18 comprises a tubular sleeve 44 of any suitable material internally threaded as at 46, externally threaded as at 48 and provided with a beveled enlargement 50 terminating outwardly in a circumferential diametrically enlarged flange 52 on the outer end of the sleeve 44.

The sleeve installing and flaring tool 22 includes a first sleeve portion 54 internally threaded at one end with lefthand threads as at 56 and one end of a cylindrical shank member 58 is snugly and rotatably received in the non-threaded end portion of the sleeve portion 54. The other end portion 60 of the shank member 58 is externally threaded with left hand threads and is threadedly engaged in the internally threaded end of the sleeve 54. The end portion 60 terminates in a diametrically reduced axial extension 62 externally threaded with right-hand threads as at 64 and including a right hand threaded axial blind bore 66. The shank member 58 includes a diametrically enlarged hexagonal head 70 defining an annular radial shoulder 72 opposing the end face 74 of the sleeve 54 adjacent the head 70, a resilient compression ring 76 being disposed between the shoulder 72 and the end face 74.

After the enlarged threaded bore 42 with its beveled portion 34 and counterbore 38 has been formed, the shank member 58 is inserted into the sleeve 54 and the left hand threaded end portion 60 is threaded into the left-hand threads 56 until the compression ring 76 is engaged by the shoulder 72. Thereafter, the tool 22 has its extension hand threaded into the threds 46 of the sleeve insert portion 18 until the end face 78 of the sleeve 54 remote from the end face 74 abuts against the end face 80 of the sleeve insert portion 18. With the sleeve insert portion 18 thus installed on the extension 62, the head 22 is utilized to hand screw the supported sleeve insert portion 18 into the threads 42 of the enlarged bore formed in the head 10. Thereafter, a wrench is applied to the head 70 and tightened securely.

Thereafter, a compression bolt 82 has its threaded shank portion 84 inserted through the central bore 88 of the flaring sleeve portion 90 of the tool 22. The compression bolt 82 includes a head 96 abuttingly engageable with the undersurface 92 of the flaring sleeve portion 90 and the latter includes circumferentially spaced beveled surfaces 94 which are wedgingly seatable in the first inserted end of the sleeve insert portion 18 in the manner illustrated in FIG. 5 of the drawings. After the flaring sleeve portion 90 has been mounted on the shank portion 84, the latter is threadedly engaged in the threaded blind bore 66 formed in the extension 62 and the compression bolt 82 is thereafter tightened so as to wedgingly seat the surfaces 94 in the first inserted end of the sleeve 44 so as to flare those portions of the inner end of the sleeve 44 and displace portions of the sleeve 44 tightly into the opposing surfaces of the threads 42 in the diametrically enlarged bore formed in the head 10. In this manner, portions of the sleeve 44 are flared into the metal of the head 10.

After the sleeve 44 has had circumferential portions thereof flared into the head 10, the bolt 82 is removed together with the flaring sleeve portion 90 and a wrench is applied to the head 70 with a second wrench applied to the sleeve 54. The sleeve 54 is then turned to the right so as to upwardly displace the sleeve 54 toward the head 70 and slightly compress the compression ring 76 while at the same time displacing the end face 78 away from the end face 80. Thereafter, the installation and flaring tool 22 may be removed from the sleeve 44 by rotation of the head 70 to the left or in a counterclockwise direction. After removal of the tool 22, the sleeve insert portion 18 is fully installed and a spark plug such as that generally designated by the reference numeral 96 may be installed in the sleeve portion 18.

The displacement of circumferentially spaced portions of the first inserted end of the sleeve into the material of the head 10 precludes any possibility of the sleeve insert portion being accidentally loosened during subsequent removal of the spark plug 96. In addition, inasmuch as the tool 22 functions to tightly threadedly secure the sleeve insert portion 18 into tight seated engagement in the counterbore 38, fluid leakage between the outer surfaces of the sleeve insert portion 18 and the threaded enlarged bore in the head 10 is eliminated in substantially all cases. However, if greater assurance of a fluid-tight seal is desired, a self-hardening and fluid-tight adhesive may be applied to the external threads of the sleeve insert portion and to the threads of the diametrically enlarged bore formed in the head 10 prior to installation of the sleeve insert portion 18. In any event, the sleeve insert portion 18 is tightly seated in its engagement with the head and existing differences in coefficients of expansion between the head 10 and the sleeve insert portion 18 tending to loosen the sleeve insert portion 18 is substantially eliminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The method of repairing a threaded through bore whose threads have been damaged, said method comprising the steps reaming the through bore to a smooth oversize bore with an enlarged counterbore at one end, tapping the oversize bore, threading an externally and internally threaded sleeve having a radially enlarged circumferentially extending flange on one end into the tapped oversize bore with the flange tightly seated in the counterbore, and flaring circumferentially spaced portions of the end of the sleeve remote from the flange into the material through which said remote end of the sleeve opens.

2. An assemblage for repairing the threads of a through bore by using an internally and externally threaded repair sleeve of substantially the same length as said through bore and including a radially outwardly projecting and circumferentially extending flange on one end and being of a size to be threaded into a threaded oversize bore provided with a counterbore at one end and with said flange tightly seated in said counterbore, said assemblage including a sleeve installing tool comprising an elongated shank member having a diametrically enlarged head on one end and provided with external left-hand threads on its other end as well as a diametrically reduced extension on said other end provided with external right-hand threads and a threaded axial blind bore, an abutment sleeve rotatably and slidably disposed over said shank member and including left-hand internal threads at one end threadedly engaged with the left-hand threads on said shank member and an end face at the other end opposing said head, and an axially compressible annular spacer disposed about said shank member between said head and said end face, said threaded extension being adapted to be threadedly engaged in said threaded oversize bore with the end face of said one end of said abutment sleeve abutted against the end face of the flanged end of the repair sleeve, a flaring sleeve having a central bore formed therethrough and positionable with said central bore aligned with said blind bore, a headed shank-type tension member whose shank is externally threaded and receivable through said central bore and threadedly engageable in said blind bore, one end of said flaring sleeve including circumferentially spaced wedge type flaring surfaces spaced about said central bore and adapted to engage and flare circumferentially spaced portions of the end of the repair sleeve remote from the flanged end thereof.

3. The combination of claim 2 wherein said assemblage includes a shank type reamer including a first smooth cylindrical pilot end portion for guiding engagement in said through bore, a central reamer portion for reaming said through bore to said oversize bore and a second reamer end portion for cutting said counter bore.

4. The combination of claim 3 wherein said assemblage includes a tap for threading said oversize bore, said tap including a first smooth cylindrical pilot end portion for guiding engagement in said oversize bore.

* * * * *